Patented Jan. 7, 1947

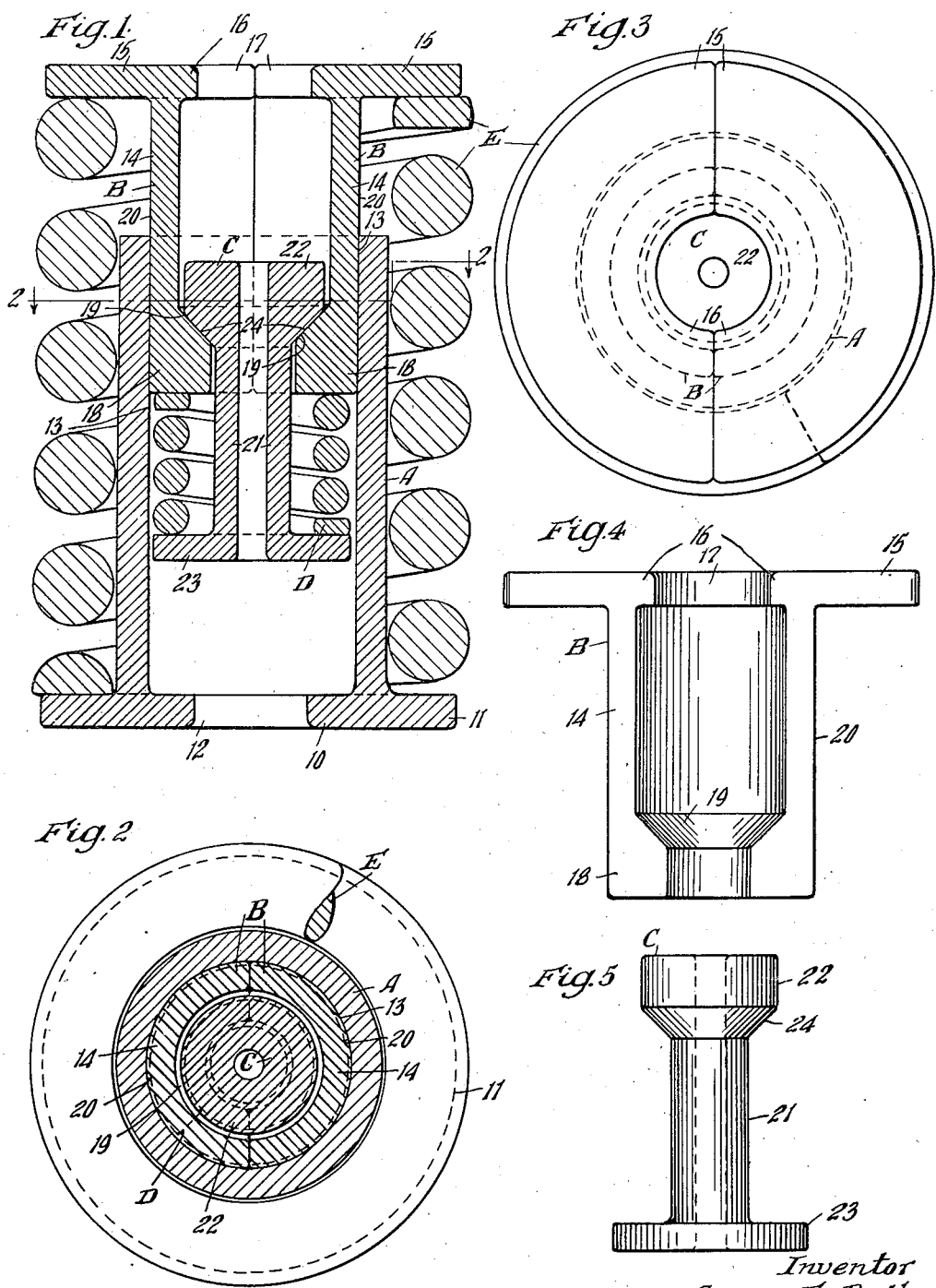

2,413,812

UNITED STATES PATENT OFFICE 2,413,812

FRICTION SHOCK ABSORBER

George E. Dath, Chicago, Ill., assignor to W. H. Miner, Inc., Chicago, Ill., a corporation of Delaware Application April 20, 1944, Serial No. 531,879

5 Claims. (Cl. 267—9)

This invention relates to improvements in friction shock absorbers, especially adapted for snubbing the action of truck springs of railway cars.

One object of the invention is to provide a friction shock absorber of the character indicated, comprising a friction casing, a plurality of friction shoes having sliding frictional engagement with the interior walls of the casing, spring actuated means for yieldingly forcing the shoes against the interior walls of the casing, and a spring surrounding the casing and shoes and opposing relative lengthwise movement of the shoes and casing toward each other, wherein the spring actuated means forces the shoes against the casing walls under constant uniform pressure.

A more specific object of the invention is to provide a shock absorber as set forth in the preceding paragraph, wherein the spring actuated means for yieldingly forcing the shoes against the interior walls of the casing comprises a wedge member having wedging engagement with the shoes, and a spring under predetermined compression, reacting between the shoes and the wedge means for forcing the latter against the shoes to hold the same spread apart.

Other objects of the invention will more clearly appear from the description and claims hereinafter following.

In the drawing forming a part of this specification, Figure 1 is a central, longitudinal, vertical sectional view of my improved shock absorber. Figure 2 is a transverse, horizontal sectional view, corresponding substantially to the line 2—2 of Figure 1. Figure 3 is a top plan view of Figure 1. Figure 4 is an elevational view of the friction shoe at the left hand side of the mechanism, as seen in Figure 1, looking from right to left. Figure 5 is a side elevational view of the wedge member.

My improved friction shock absorber comprises broadly a friction casing A; two friction shoes B—B; a wedge member C; an inner spring D reacting between the shoes and the wedge member; and an outer spring E opposing relative approach of the shoes and friction casing.

The friction casing A is in the form of a hollow cylinder open at the upper end and having a transverse bottom wall 10. The bottom wall 10 is extended laterally beyond the outer side of the casing, providing a flange 11 forming an annular follower member. The bottom wall 10 is provided with a central opening 12 adapted to receive the usual spring centering projection on the lower spring follower plate of the truck spring cluster. The casing A presents a longitudinally extending, interior friction surface 13 with which the friction shoes B—B have sliding engagement.

The friction shoes B—B are of similar design, each shoe comprising a transversely curved plate section 14 having a laterally outwardly projecting follower flange 15 at the upper end thereof. On the inner side at the upper end, each shoe has a web 16 which is in alignment with the flange 15 thereof. The web 16 is recessed, as indicated at 17, to provide, with the corresponding recess of the web 16 of the other shoe, a seat for accommodating the spring centering projection of the upper spring follower plate of the truck spring cluster. At the lower end, each shoe is provided with an inwardly thickened or enlarged portion 18 having a wedge face 19. The wedge face 19 faces upwardly and is of substantially conical contour. On the outer side, each shoe has a transversely curved, longitudinally extending friction surface 20. The two shoes B—B, in the assembled condition of the shock absorber, are slidingly telescoped within the casing with the friction surfaces 20—20 thereof in sliding engagement with the interior friction surface 13 of the casing.

The wedge member C comprises a cylindrical post 21 having a head 22 at the upper end thereof which forms the wedge member proper. At the lower end, the post 21 is provided with an annular follower flange 23 which serves as an abutment for the lower end of the spring D. The head 22 of the wedge member is provided with a conical wedge face 24 which is in wedging engagement with the wedge faces 19—19 of the two friction shoes B—B.

The inner spring D, which is in the form of a helical coil, is interposed between the inner ends of the shoes B—B and the follower flange 23 of the wedge member C. This spring is under predetermined compression and yieldingly forces the wedge C in wedging engagement with the shoes to hold the shoes spread apart in tight frictional contact with the interior friction surface 13 of the casing A. The compression under which the spring is placed may be any desired amount but the best results have been found to be produced when the spring is completely closed.

The outer spring E, which is also in the form of a helical coil, surrounds the casing A and the shoes B—B and has its upper and lower ends bearing respectively on the flanges 11 of the casing and the flanges 15—15 of the shoes.

In assembling the shock absorber, the spring E is first placed about the casing A in position resting on the flange 11 of the latter. The spring D is then placed about the post of the wedge C and compressed. The shoes B—B are next engaged with the wedge faces of the wedge member and the assembled shoes B—B, wedge C, and spring D are telescoped as a unit within the casing A.

My improved shock absorber is substituted for one or more of the coil spring units of a cluster of truck springs, the same being interposed between the top and bottom spring follower plates of said cluster.

The operation of the improved shock absorber is as follows: Upon the spring cluster of the truck of the railway car being compressed between the spring follower plates of the cluster, the shoes B—B and the friction casing A are moved in lengthwise direction toward each other, thereby compressing the spring E and sliding the shoes inwardly along the friction surface of the casing, thus producing the required amount of frictional resistance to snub or dampen the action of the coils of the truck spring cluster. As will be evident, the frictional resistance provided is substantially constant as the spring E, which acts on the wedge C to wedge the shoes apart, is under a predetermined compression, which remains constant throughout the operation of the shock absorber.

During recoil of the truck springs, expansion of the spring E returns all of the parts to the normal position shown in Figure 1. As will be evident, the frictional resistance provided between the shoes and the casing being constant during all phases of the operation of my improved shock absorber, the same amount of frictional resistance to snub the action of the truck spring is provided during both compression and recoil of the same.

I have herein shown and described what I now consider the preferred manner of carrying out my invention, but the same is merely illustrative and I contemplate all changes and modifications that come within the scope of the claims appended hereto.

I claim:

1. In a friction shock absorber, the combination with a friction casing; of a plurality of friction shoes slidingly telescoped within the casing, said shoes normally extending outwardly of the casing to receive the actuating force having inner wedge faces at their inner ends; a wedge member spaced inwardly of the outer ends of the shoes and having a head at the outer end provided with wedge faces engaging the wedge faces of the shoes, and a follower at the inner end spaced inwardly from the inner ends of the shoes; and a spring under predetermined compression buttressed at opposite ends against said follower and the inner ends of said shoes.

2. In a friction shock absorber, the combination with a friction casing having longitudinally extending, interior friction surfaces; of a plurality of friction shoes telescoped within the casing in sliding engagement with the friction surfaces of the latter, said shoes having interior wedge faces at the inner ends thereof; a wedge member comprising a wedge block at the outer end and a follower at the inner end connected to said block by a stem, said wedge block having wedge faces in wedging engagement with the wedge faces of the shoes, said shoes projecting outwardly of the mechanism beyond said wedge block and directly receiving the actuating force; and a spring under predetermined compression interposed between the inner ends of the shoes and the follower of the wedge member.

3. In a friction shock absorber, the combination with a friction casing; of a plurality of friction shoes slidingly telescoped within the casing, said shoes having inner wedge faces at their inner ends; a wedge member having a head at the outer end provided with wedge faces engaging the wedge faces of the shoes, and a follower at the inner end spaced inwardly from the inner ends of the shoes; a spring under predetermined compression buttressed at opposite ends against said follower and inner ends of the shoes; and a spring surrounding said casing and shoes opposing relative lengthwise movement thereof toward each other.

4. In a friction shock absorber, the combination with a friction casing having longitudinally extending, interior friction surfaces; of a plurality of friction shoes telescoped within the casing in sliding engagement with the friction surfaces of the latter, said shoes having interior wedge faces at the inner ends thereof; a wedge member comprising a wedge block and a follower connected to said block by a stem, said wedge block having wedge faces in wedging engagement with the wedge faces of the shoes; a spring under predetermined compression interposed between the inner ends of the shoes and the follower of the wedge member; and a spring surrounding said casing and shoes opposing relative lengthwise movement thereof toward each other.

5. In a friction shock absorber, the combination with a friction casing having longitudinally extending, interior friction surfaces, said casing having a follower flange at the outer end thereof; of a plurality of friction shoes telescoped within the casing in sliding engagement with the friction surfaces of the latter, said shoes having interior wedge faces at the inner ends thereof, said shoes having follower flanges at the outer ends thereof; a wedge member comprising a wedge block and a follower connected to said block by a stem, said wedge block having wedge faces in wedging engagement with the wedge faces of the shoes; a spring under predetermined compression interposed between the inner ends of the shoes and the follower of the wedge member; and a spring surrounding said casing and shoes and bearing at opposite ends on the follower flanges of said shoes and casing respectively.

GEORGE E. DATH.